United States Patent
Xi (10) Patent No.: US 7,315,512 B2
(45) Date of Patent: Jan. 1, 2008

(54) METHOD FOR REDUNDANCY BACKUP OF SIGNALING LINK IN IP NETWORK

(75) Inventor: Min Xi, Shenzhen (CN)

(73) Assignee: ZTE Corporation, Shenzhen Guang Dong Province (CN)

( * ) Notice: Subject to any disclaimer, the term of this patent is extended or adjusted under 35 U.S.C. 154(b) by 549 days.

(21) Appl. No.: 10/496,818

(22) PCT Filed: Nov. 28, 2002

(86) PCT No.: PCT/CN02/00854

§ 371 (c)(1),
(2), (4) Date: Jan. 6, 2005

(87) PCT Pub. No.: WO03/047156

PCT Pub. Date: Jun. 5, 2003

(65) Prior Publication Data

US 2005/0105695 A1    May 19, 2005

(30) Foreign Application Priority Data

Nov. 30, 2001 (CN) ................................ 01 1 39026

(51) Int. Cl.
*G01R 31/08* (2006.01)
(52) U.S. Cl. ...................... 370/228; 370/466; 370/401; 370/385

(58) Field of Classification Search ...................... None
See application file for complete search history.

(56) References Cited

U.S. PATENT DOCUMENTS 6,839,344 B1 *  1/2005  Couillaud et al. .......... 370/353
7,245,874 B2 *  7/2007  Rest et al. .................. 455/12.1

* cited by examiner

*Primary Examiner*—Duc Ho
(74) *Attorney, Agent, or Firm*—Jenner & Block LLP (57) ABSTRACT

The invention discloses a method for implementing signaling link redundancy in IP networks. Two ASPs are created for the same AS in the host at the IP network side, and all user adaptation protocols share ASPSM and ASPTM messages so that the states of the two ASPs can become active and inactive respectively, thus to implement two signaling links for serving the same traffic. When switch is initiated, SCTP association can be closed by using "graceful close", and the SCTP itself will make sure to send out all the data remaining in its buffer and its higher-layer applications will also send subsequent data in order after learning the remaining data are all sent out, thus sequential delivery for the data can be guaranteed. This method can avoid data loss and disorder, and the speed for switch can be ensured because the backup link will be notified immediately after the data on the primary link are sent out.

6 Claims, 6 Drawing Sheets

Fig.11

METHOD FOR REDUNDANCY BACKUP OF SIGNALING LINK IN IP NETWORK

CROSS REFERENCE TO RELATED APPLICATIONS

This application is the U.S. National Patent Application corresponding to PCT Pat. application No. PCT/CN02100854 filed on Nov. 28, 2002, which claims priority from Chinese Patent Application No. 01139026.3 filed on Nov. 30, 2001.

FIELD OF THE INVENTION

The present invention relates generally to a method for accurate data delivery between IP networks and conventional telecommunication networks, and more particularly, to a method for implementing signaling link redundancy in IP networks.

BACKGROUND OF THE INVENTION

Figure 1:
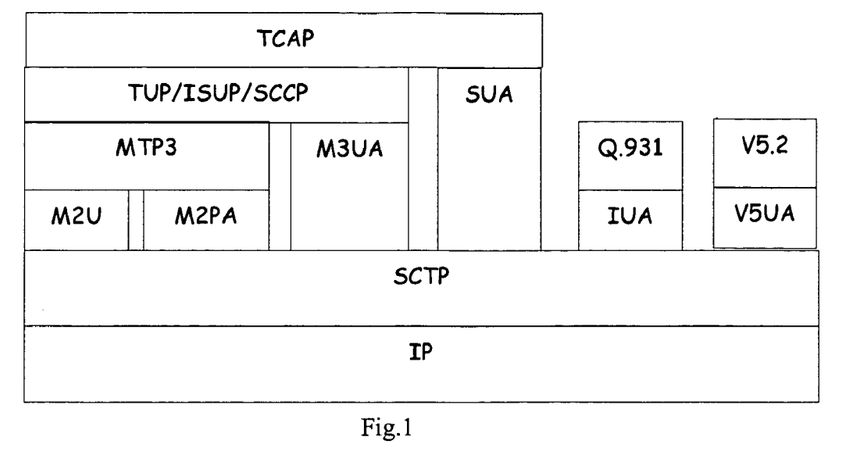
FIG. 1 illustrates the model for adapting each signaling of conventional telecommunication networks into IP networks proposed by IETF.
Figure 2:
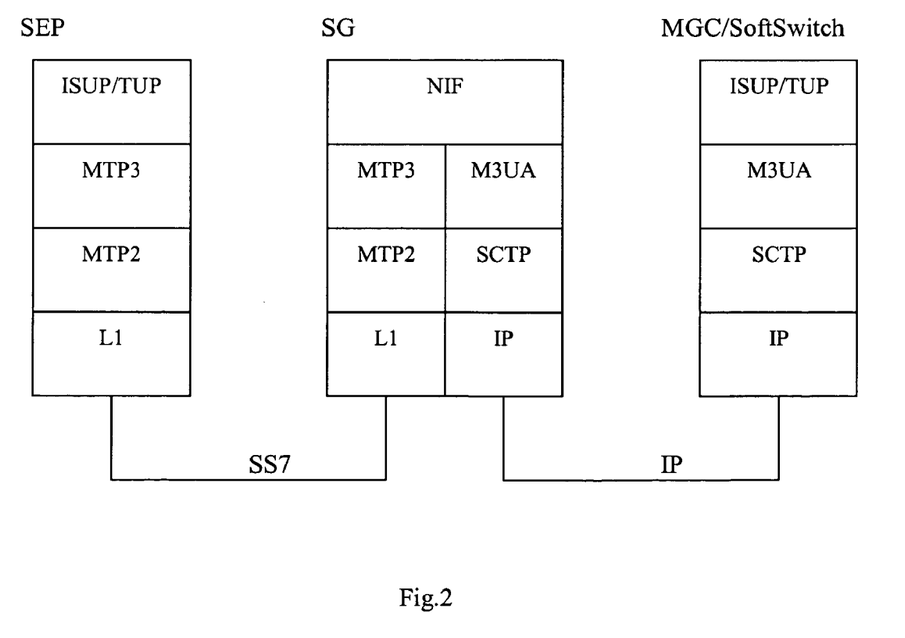
FIG. 2 illustrates the model for adapting #7 signaling from SS7 network into IP network through M3UA (MTP 3 User Adaptation Layer) proposed by IETF.

In order to transit smoothly from conventional telecommunication networks to next-generation IP networks, IETF (Internet Engineering Task Force) proposes a set of signaling transport (SIGTRAN) protocol model, for adapting various signaling messages in conventional telecommunication networks into IP networks, herein adapting specifically means replacing the previous information exchanges (including primitive, message and etc) between software modules put together with standard protocol so that two software modules can be separated completely without making modification. As shown in FIG. 1, signaling in conventional telecommunication network includes SS7 (Signaling System 7), DSS1 (Digital Subscriber Signaling System No.1), V5 Signaling, SCCP (Signaling Connection Control Part) and etc. All of these protocols take SCTP/IP as their lower-layer carrier protocol. For different signaling, the signaling messages can be transferred over IP networks by using different adaptation protocols according to practical requirements, and the carried signaling is setting on top of the adaptation protocol. The signaling data and command packet will be converted into corresponding adaptation protocol packet, and then be transferred to the destination in IP network via SCTP.

In this model, the SG (Signaling Gateway) on the border between conventional telecommunication network and IP network is responsible for conversion between signaling messages and IP packets. When there is any message to be transferred to SoftSwitch or MGC (Media Gateway Controller) in the SEP, the SEP (Signaling End Point) first sends the message to the SG through the signaling link between the SEP and the SG Upon receipt of the signaling message from its peer, the signaling carrier module in the SG reports it to the higher-layer via the internal interface, and meanwhile a fake higher-layer user module converts the signaling message into the corresponding different UA(User Adaptation) message according to the corresponding data and then sends UA message to the corresponding SoftSwitch or MGC over the established SCTP (Stream Control Transfer Protocol) connection. The UA module in the SoftSwitch or MGC recovers the received message and notifies it to the user applications of the higher layer through the internal interface, thus the signaling message is transferred from conventional telecommunication network to IP network. Contrarily, when the ISUP (ISDN User Part) or TUP (Telephone User Part) module in the Softswitch or MGC has any message to be transferred to the SEP in conventional telecommunication network, the message will be delivered to the UA module through the internal interface, and further transferred to the SG via SCTP. After obtaining the message received by the UA module, the fake high-layer user module in the SG sends it to the signaling carrier module in the SG through the same internal interface. Ultimately, the message arrives at the SEP through the signaling link between the SG and the SEP, and thus the transfer to conventional telecommunication network from IP network is achieved.

To adapt various signaling transfer into the new topologies in IP network, SIGTRAN protocols group introduces the notion of AS (Application Server) and ASP (Application Server Process) for all adaptation protocols. AS represents the collection of some specific signaling messages with advantage at shielding the difference in signaling ways, while ASP represents the process instance for handling the signaling message represented by the AS running on the SoftSwitch or MGC. After receiving a signaling message, the SG finds the AS to which the SG belongs according to the characteristics value carried in the message, then finds the available ASP according to the AS, and finally encapsulates the signaling message into IP packet and sends it to the SoftSwitch or MGC to which the ASP is pertained. Thus, signaling message distribution from signaling network to IP network is accomplished. An AS can be handled by one ASP, or by several ASPs simultaneously to achieve load share.

All adaptation protocol messages have ASPSM (Application Server Process State Maintenance) and ASPTM (Application Server Process Traffic Maintenance) messages with the same function, and the two messages are for implementing signaling link in IP networks. In addition, all adaptation protocols have SCTP as their carrier protocol. Therefore, all kinds of signaling links can utilize the same technique to realize redundancy.

Figure 7:
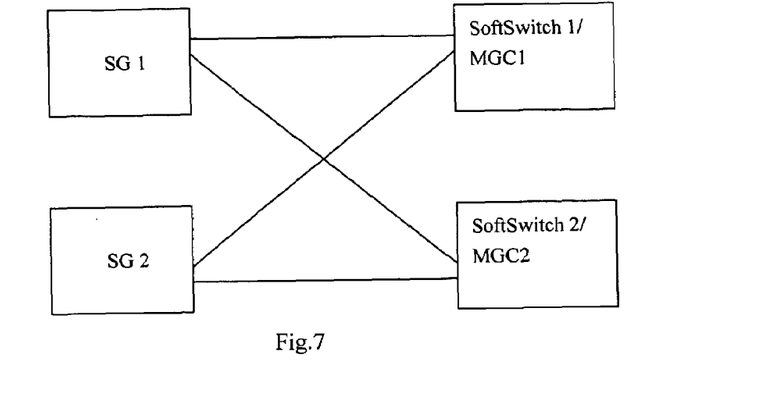
FIG. 7 illustrates the physical architecture of the SIGTRAN primary/backup link redundancy proposed by IETF.

There have been some discussions and considerations for link redundancy in current protocols, and the physical model is illustrated in FIG. 7. Every SG can connect several MGCs and every MGC can connect several SGs too. For those traffics that belong to the same AS, the SG can hand them to several MGCs for handling respectively according to the specific redundancy rule. The traffic messages of the same MGC can also be handed to different SGs for delivery according to the specific redundancy rule. Thus, it can be seen that the redundancy considered in the protocol is based on the whole network topology in such a basic way that two reliable connections are established respectively as the primary and backup links. In normal condition, the connection of the primary link is for data transmission and reception while the backup data is not for data transmission and reception. When a device has malfunction or doesn't work properly, all traffics will be handled by the backup link. Since different connections over IP networks are very likely to traverse across different networks, there can be great difference between the transfer rate of the primary link and that of the backup link. During switch, the late transmitted data may arrive earlier, which can lead to data disorder and loss. Under this situation, the protocol has not yet offered a good solution to avoid the data loss and disorder during switch.

SUMMARY OF THE INVENTION

The present invention aims at effectively avoiding data disorder and loss during switch between the primary and backup links in SIGTRAN protocol and proposes a method for implementing signaling link redundancy based on SIGTRAN adaptation model.

To achieve the above object, the method for implementing signaling link redundancy in IP networks comprises:

(1) the ASPs corresponding to the two links are configured in the host at the IP network side, and the two ASPs establish SCTP association with the SG respectively after startup;

(2) after SCTP association is established successfully, ASP startup messages are sent to the UA modules of the two ASPs respectively;

(3) after receiving the ASP startup ACK message from the SG, the UA module of the primary link sends ASP ACTIVE message, whereas the backup link is inactive without transmission and reception of signaling messages;

(4) the UA module of the primary link enters into active state after receiving the ASP ACTIVE ACK message, while the UA module of the backup link keeps inactive;

(5) when switch is required to initiate, the UA module of the primary link at the side requesting for switch sends a request for "graceful close" the primary link to the SCTP carrier module in the lower layer;

(6) after the "graceful close" is successful, the UA module of the backup link sends ASP ACTIVE message, and the backup link starts data transmission and reception;

(7) if the above "graceful close" request in step (5) is not successful, mandatory switch will be performed.

In the above method, step (5) can also comprise: when switch between the primary and backup links is required to initiate, setting a switch timing so that mandatory switch can be performed if the preset switch timing expires and the request for "graceful close" is not accomplished yet.

In the proposed method, two ASPs are created for the same AS in the host at the IP network side, and all user adaptation protocols share ASPSM and ASPTM messages so that the states of the two ASPs can become active and inactive respectively, thus to implement two signaling links for serving the same traffic. When switch is carried out, SCTP association can use "graceful close", and the SCTP itself will make sure to send out all the data remaining in its buffer and the applications on the SCTP will also send subsequent data in order after learning the remaining data are all sent out, thus sequential delivery for the data can be guaranteed. This method can avoid data loss and disorder, and the speed for switch can be ensured because the backup link will be notified immediately after the data on the primary link are sent out.

DETAILED DESCRIPTION OF THE INVENTION

Detailed description of the proposed method will be given below, in conjunction with accompanying drawings and embodiments.

Figure 3:
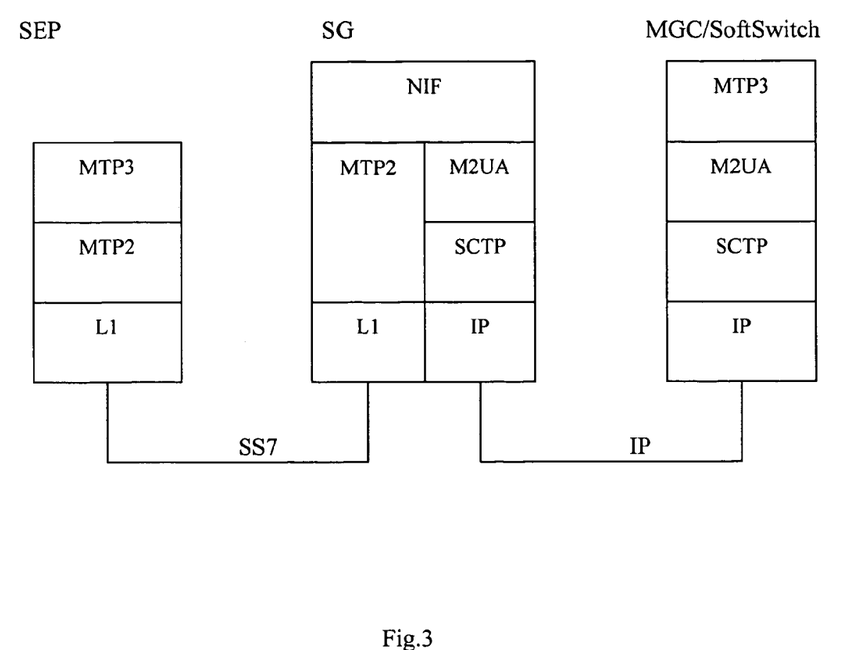
FIG. 3 illustrates the model for adapting #7 signaling from SS7 network into IP network through M2UA (MTP 2 User Adaptation Layer) proposed by IETF.
Figure 4:
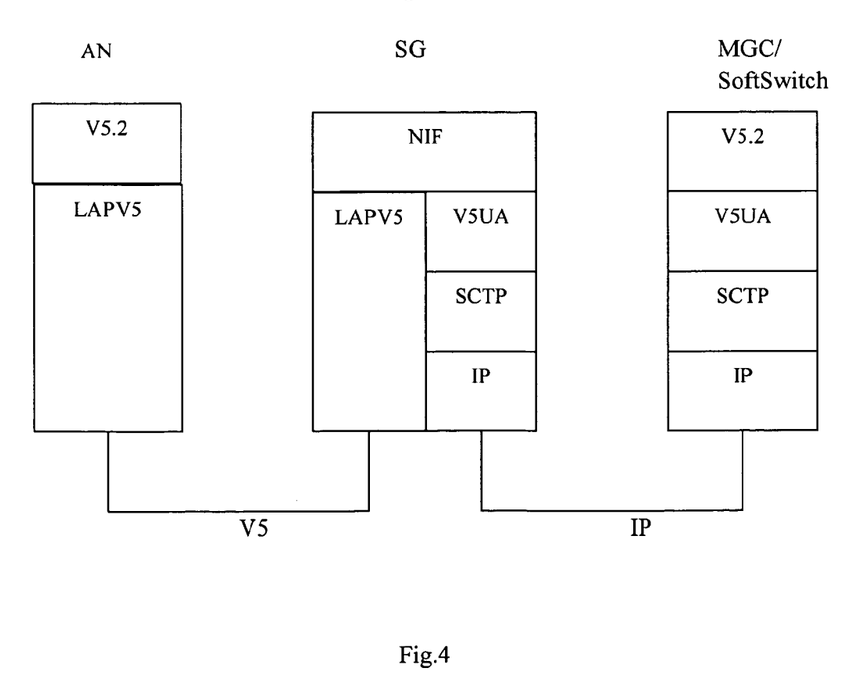
FIG. 4, FIG. 5 and FIG. 6 respectively represent the adaptation models for V5 protocol, ISDN protocol and SCCP protocol proposed by IETF.
Figure 5:
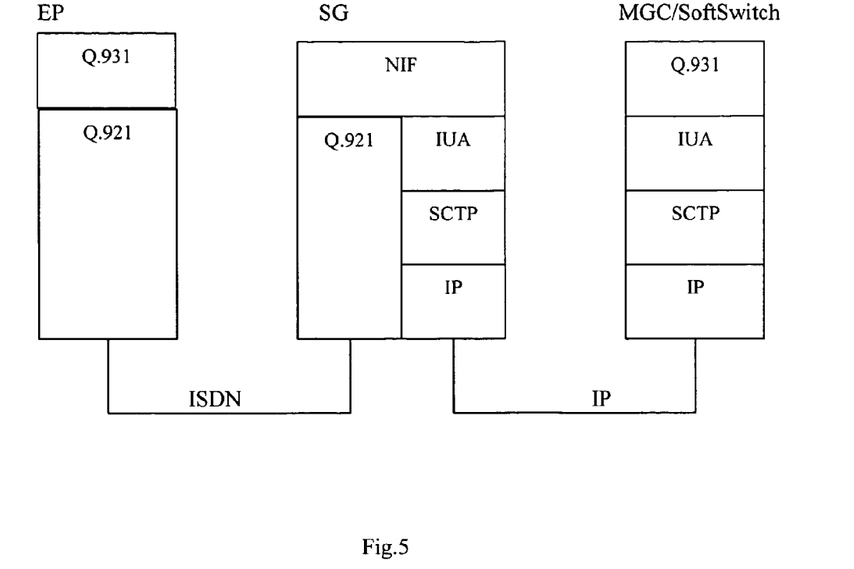
Figure 6:
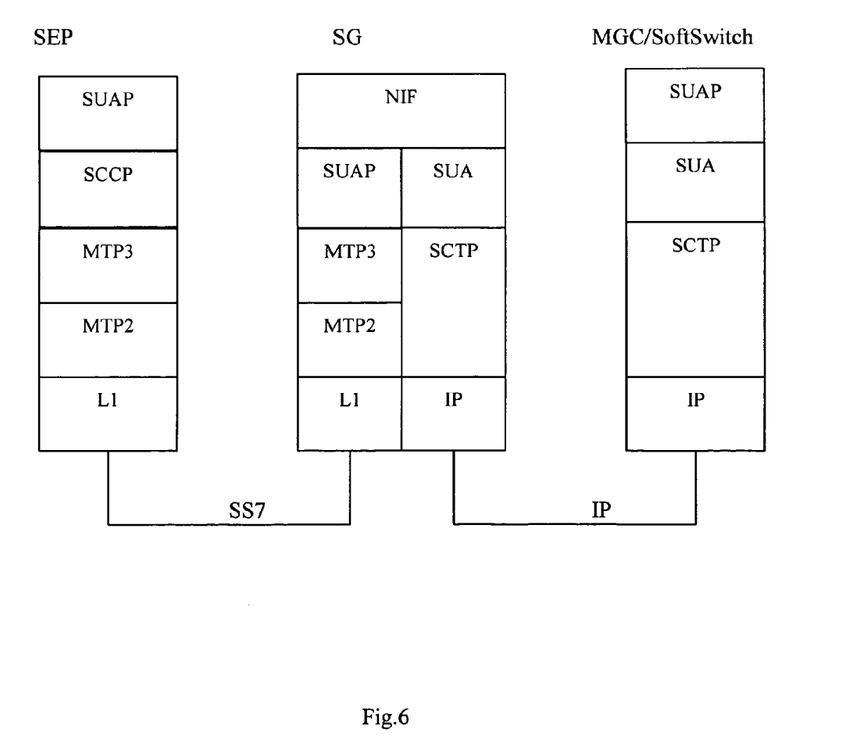

FIG. 1 has been explained before and won't be elaborated any more herein. FIG. 2 to FIG. 6 illustrate the physical layer and signaling protocols involved in adapting various signaling messages of conventional telecommunication networks into IP networks. It can be seen that all protocols have the common ground of taking SCTP/IP as their lower-layer carrier protocol. Different signaling can use different adaptation protocols according to practical requirement. For instance, in FIG. 2, #7 signaling adopts M3UA adaptation protocol, wherein SEP represents Signaling End Point, ISUP represents ISDN User Part, TUP represents Telephone User Part, MTP3 represents Message Transfer Part Level 3, MTP2 represents Message Transfer Part Level 2, L1 represents Message Transfer Part Level 1, NIF represents Nodal Interworking Function, M3UA represents MTP3 User Adaptation Layer, SCTP represents Stream Control Transmission Protocol, SG represents Signaling Gateway, MGC represents Media Gateway Controller and SoftSwitch represents soft switch. In FIG. 3, #7 signaling adopts M2UA protocol, wherein SEP represents Signaling End Point, MTP3 represents Message Transfer Part Level 3, MTP2 represents Message Transfer Part Level 2, L1 represents Message Transfer Part Level 1, NIF represents Nodal Interworking Function, M2UA represents MTP2 User Adaptation Layer, SCTP represents Stream Control Transmission Protocol, SG represents Signaling Gateway, MGC represents Media Gateway Controller and SoftSwitch represents soft switch. In FIG. 4, V5 signaling adopts V5UA adaptation protocol, wherein AN represents Access Network, LAPV5 represents Link Access Process for V5 link, NIF represents Nodal Interworking Function, V5UA represents V5 User Adaptation Layer, SCTP represents Stream Control Transmission Protocol, SG represents Signaling Gateway, MGC represents Media Gateway Controller and SoftSwitch represents soft switch. In FIG. 5, ISDN adopts IUA adaptation protocol, wherein EP represents ISDN End Point, NIF represents Nodal Interworking Function, IUA represents ISDN User Adaptation Layer, SCTP represents Stream Control Transmission Protocol, SG represents Signaling Gateway, MGC represents Media Gateway Controller and SoftSwitch represents soft switch. In FIG. 6, SCCP signaling adopts SUA adaptation protocol, wherein SEP represents Signaling End Point, SCCP represents Signaling Connection Control Part, SUAP represents the Higher-layer User Part of SCCP, MTP3 represents Message Transfer Part Level 3, MTP2 represents Message Transfer Part Level 2, L1 represents Message Transfer Part Level 1, NIF represents Nodal Interworking Function, SUA represents SCCP User Adaptation Layer, SCTP represents Stream Control Transmission Protocol, SG represents Signaling Gateway, MGC represents Media Gateway Controller and SoftSwitch represents soft switch. Above the adaptation protocol, there are the carried signaling data and command packet. Signaling data and command packet are converted into the corresponding adaptation protocol packets, and then delivered to the destination in IP networks by using SCTP.

The method will be described below, by taking an example where data exchange occurs between SS7 network and IP network. The host at the IP network side can be MGC or SoftSwitch system, and we take the MGC as an example here. The ASPs corresponding to the two links are configured in the MGC and the two ASPs establish SCTP association with the SG respectively after startup. After SCTP association is established, ASP startup messages are sent to the UA modules of the two ASPs respectively. On receipt of the ASP startup ACK message from the SG, the UA module of the primary link sends ASP ACTIVE message, where the traffic mode in the message is override, whereas the backup link is inactive without transmission and reception of signaling messages. The UA module of the primary link enters into active state on receipt of the ASP ACTIVE ACK message, while the UA module of the backup link keeps inactive. When switch is required to initiate, the UA module of the primary link at the side requesting for switching sends request for "graceful close" the primary link to the SCTP carrier module of the lower-layer. To avoid failure of "grace close" caused by the anomaly of the lower-layer carrier state or network, a switch timing can be set when the switch is initiated so that mandatory switch will be performed if the switch time expires and the request for "graceful close" is not accomplished yet.

Both ends (SG and MGC or SoftSwitch) of a signaling link in IP networks can initiate switch request. The mechanism is the same for the two cases, but there can be of some slight differences in operations since the two ends are not peers.

Figure 8:
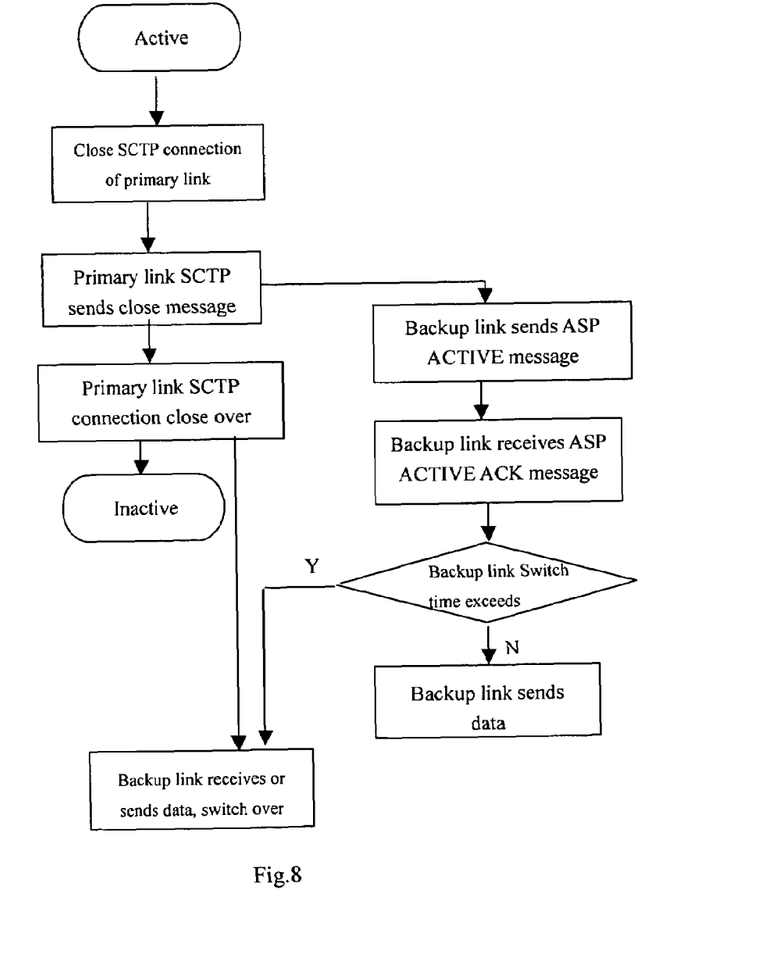
FIG. 8 and FIG. 9 are flowcharts illustrating the switch initiated by MGC and SG respectively when utilizing the method of the present invention, by exemplifying data exchange between SS7 network and IP network.

As FIG. 8 shows, when the MGC initiates switch for the primary/backup links, the UA module of the primary link first sends "graceful close" request to the SCTP carrier module of the lower-layer, pauses data transmission and buffers the subsequent data at the same time. As specified in the protocol, SCTP stops receiving higher-layer data on receipt of the "graceful close" request from higher-layer and sends a SHUTDOWN message to its peer after sending out all of the data packets in its sending buffer. Meanwhile SCTP notifies the UA module so that the latter can learn the data requested for transmission have been sent out. The UA module of the backup link sends ASP activation message to the SG immediately after knowing the SHUTDOWN message of the primary link has been sent out, wherein the traffic mode is override. As specified in the protocol, on receipt of the activation message (override mode) from the backup link, the SG will take this ASP as the primary ASP of the AS, i.e. the subsequent No.7 messages will be distributed to this ASP and at the same time ASP ACTIVE ACK message will be sent to the MGC. After receiving the ASP ACTIVE ACK message from the SG, the backup link can only send data out but not receive data for now if the "graceful close" procedure of the primary link is not finished yet. After the primary link accomplishes "graceful close" procedure, the backup link can transmit and receive data.

Figure 9:
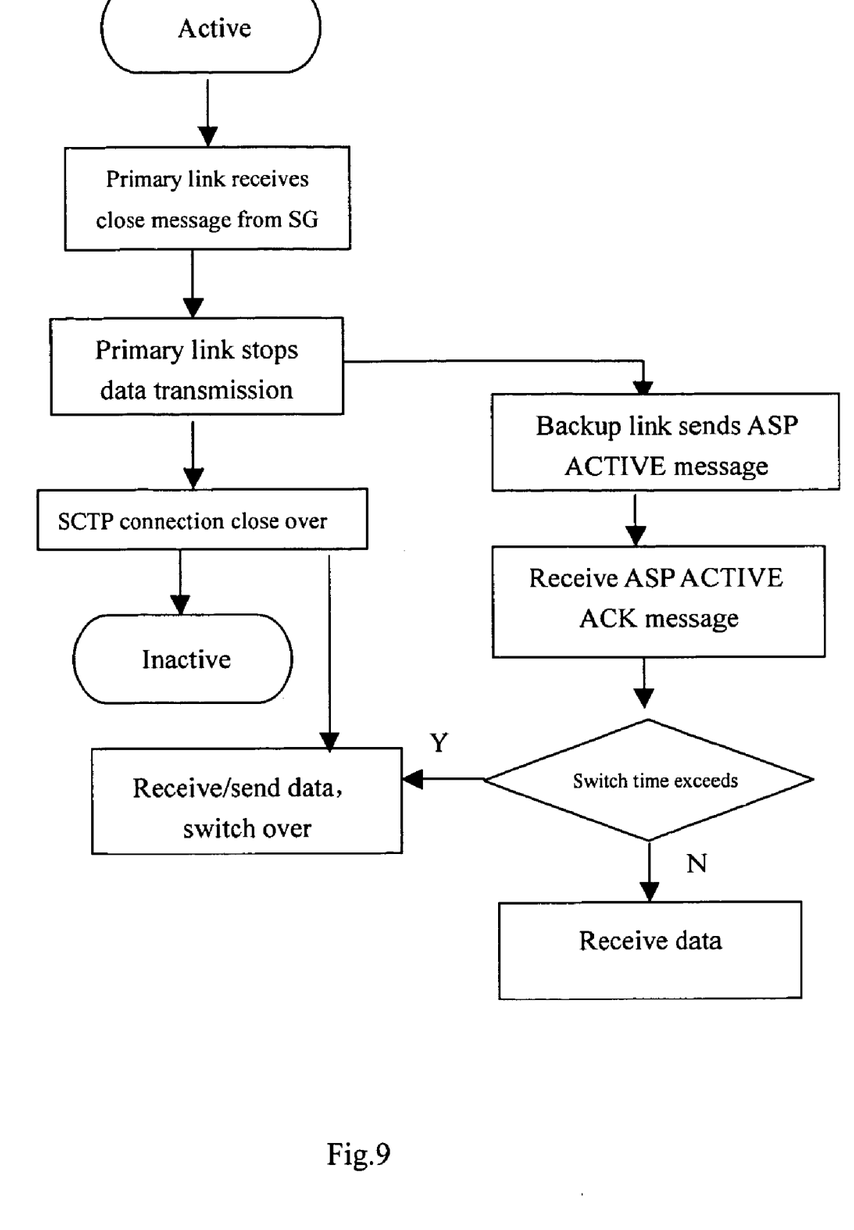

Referring to FIG. 9, when the SG initiates primary/backup switch, the UA module at the SG side requests for "graceful close" the connection of the primary link, and stores the data to be transmitted in its buffer temporarily. After sending out the data in the buffer, the SCTP sends a SHUTDOWN message to its peer as specified in the protocol. After receiving the SHUTDOWN message, the SCTP of the primary link in the MGC notifies the higher-layer UA module. After learning the SHUTDOWN message received by the SCTP, the UA module of the primary link stops data transmission over the primary link and the UA module of the backup link immediately sends ASP ACTIVE message, where the traffic mode is override. On receipt of the ASP ACTIVE ACK message from the SG, if the "graceful close" procedure of the primary link is not finished yet, the backup link can only receive data and not send data out temporarily. After the primary link accomplishes "graceful close" procedure, the backup link can receive and transmit data.

If the primary link can't accomplish "graceful close" due to malfunction, the backup link can be activated to override the former primary link, but transmission of the above data should be delayed for a while to guarantee the message sequence as much as possible.

Figure 10:
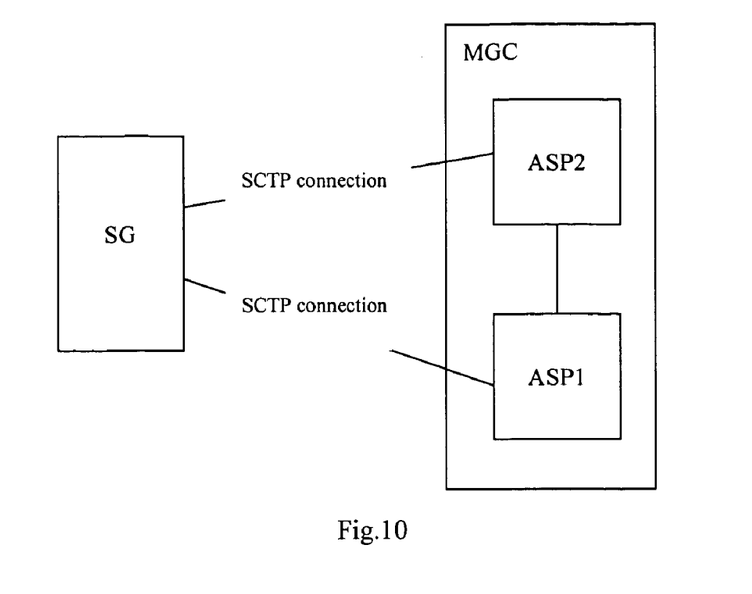
FIG. 10 depicts the physical model for implementing the method of the present invention in a MGC.

FIG. 10 shows the redundancy model put forward based on the method of the present invention. Two ASPs are configured in a MGC, denoted as ASP1 and ASP2 respectively, and they serve the same AS, i.e. process the same signaling messages. In general, the two ASPs are located on different processing boards, while they can also be located on the same processing board.

Figure 11:
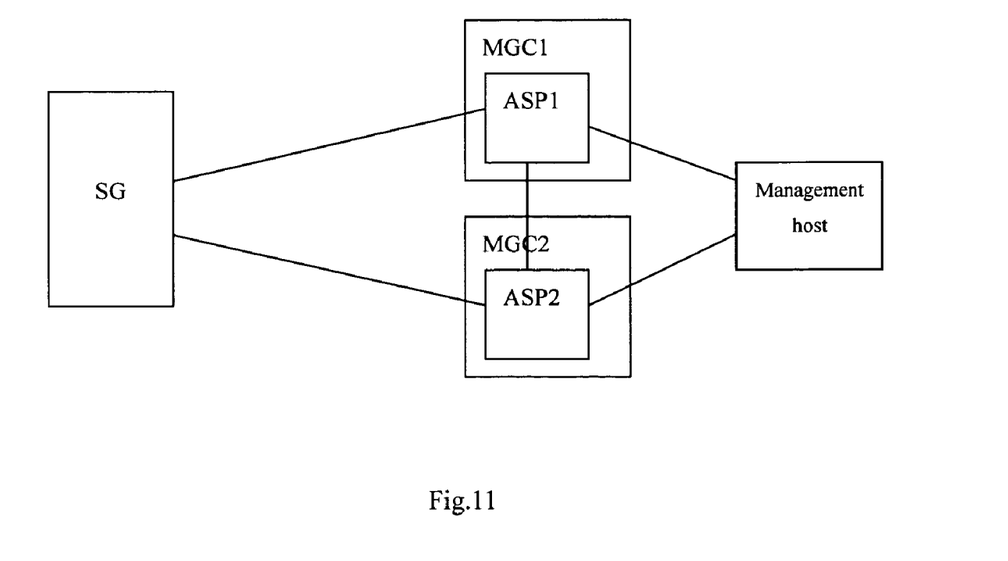
FIG. 11 depicts the physical model for implementing the method of the present invention between multiple MGCs.

The present invention can also be extended in such a way that the primary and backup signaling links are implemented between multiple MGCs, as shown in FIG. 11, where ASP1 is established in MGC1 and ASP2 in MGC2. In this case, reliable transport protocols are needed for message interaction and data transfer between two hosts. In addition, to realize better control, a management host can be added for primary/backup management.

What is claimed is:

1. A method for implementing signaling link redundancy in IP networks, comprising:

the ASPs (Application Server Process) corresponding to the two links are configured in the host at the IP network side, and the said two ASPs establish SCTP (Stream Control Transfer Protocol) association with the SG (Signaling Gateway) respectively after startup;

after SCTP association is established successfully, sending ASP startup messages to the UA(User Adaptation) modules of the two ASPs respectively;

after receiving the ASP startup ACK message from the SG, the UA module of the primary link sends ASP ACTIVE message, whereas the backup link is inactive without transmission and reception of signaling messages;

the UA module of the primary link enters into active state after receiving the ASP ACTIVE ACK, while the UA module of the backup link keeps inactive;

when switch is required to initiate, the UA module of the primary link requesting for switch sends a request for "graceful close" the primary link to the SCTP carrier module in the lower layer;

"graceful close" the primary link;

after the "graceful close" is successful, the UA module of the backup link sends ASP activation message, and the backup link starts data transmission and reception;

if said "graceful close" is not successful, mandatory switch will be performed.

2. The method for implementing signaling link redundancy in IP networks according to claim 1, further comprising:

when switch between the primary and backup links is required to initiate, setting a switch timing so that mandatory switch can be performed if the preset switch time expires and the request for "graceful close" is not accomplished yet.

3. The method for implementing signaling link redundancy in IP networks according to claim 1 or 2, wherein when the host at the IP network side initiates switch, the "graceful close" of the primary link further comprises:

the UA module of the primary link pauses data transmission and buffers subsequent data;

the SCTP stops receiving higher-layer data on receipt of the "graceful close" request from higher-layer, and sends a SHUTDOWN message to its peer after sending out all the data packets in its sending buffer;

the SCTP notifies the UA module so that the latter knows the data requested for transmission have all been sent out successfully;

the UA module of the backup link sends ASP activation message to the SG immediately after knowing the SHUTDOWN message of the primary link has been sent out;

on receipt of the ACTIVE message from the backup link, the SG takes this ASP as the primary ASP of the AS, and at the same time sends ASP ACTIVE ACK message to the host at the IP network side;

during the "graceful close" procedure of the primary link, the backup link can only send data out but not receive data temporarily.

4. The method for implementing signaling link redundancy in IP networks according to claim 1 or 2, wherein when the SG initiates switch, the "graceful close" of the primary link further comprises:

after initiating the requests for "graceful close" the primary link, the UA module at the SG side stores the data to be transmitted in its buffer temporarily;

after sending out the data in the buffer, the SCTP sends a SHUTDOWN message to its peer;

after receiving the SHUTDOWN message, the SCTP of the primary link at the network side notifies its higher-layer UA module;

after obtaining the SHUTDOWN message received by SCTP, the UA module of the primary link stops data transmission over the primary link and the UA module of the backup link immediately sends ASP ACTIVE message;

on receipt of the ASP ACTIVE ACK message from the SG, if the "graceful close" procedure of the primary link is not finished yet, the backup link can only receive data and not send data out temporarily.

5. The method for implementing signaling link redundancy in IP networks according to claim 1 or 2, wherein said host at the IP network side can be MGC or SoftSwitch.

6. The method for implementing signaling link redundancy in IP networks according to claim 5, wherein said MGCs can be multiple, and there can also be a management host for managing and controlling the primary and backup links.

* * * * *

UNITED STATES PATENT AND TRADEMARK OFFICE
CERTIFICATE OF CORRECTION

PATENT NO. : 7,315,512 B2
APPLICATION NO. : 10/496818
DATED : January 1, 2008
INVENTOR(S) : Min Xi Page 1 of 1

It is certified that error appears in the above-identified patent and that said Letters Patent is hereby corrected as shown below:

Column 1, line 7, delete "Pat. application" and insert -- Patent Application --

Column 1, line 53, insert -- . -- after SG

Signed and Sealed this

Twenty-ninth Day of April, 2008

JON W. DUDAS
*Director of the United States Patent and Trademark Office*